(12) United States Patent
Tomelero

(10) Patent No.: US 9,913,421 B2
(45) Date of Patent: Mar. 13, 2018

(54) SUSPENSION ASSEMBLY AND KIT FOR A PLANTER

(71) Applicant: CNH INDUSTRIAL AMERICA LLC, New Holland, PA (US)

(72) Inventor: Eleandro Tomelero, Passo Fundo (BR)

(73) Assignee: CNH Industrial America LLC, New Holland, PA (US)

( * ) Notice: Subject to any disclaimer, the term of this patent is extended or adjusted under 35 U.S.C. 154(b) by 41 days.

(21) Appl. No.: 15/098,033

(22) Filed: Apr. 13, 2016

(65) Prior Publication Data
US 2016/0316609 A1 Nov. 3, 2016

(51) Int. Cl.
| | |
|---|---|
| A01C 7/20 | (2006.01) |
| A01C 5/06 | (2006.01) |
| A01B 49/02 | (2006.01) |
| A01B 49/06 | (2006.01) |
| A01B 61/04 | (2006.01) |
| A01B 63/00 | (2006.01) |

(52) U.S. Cl.
CPC .......... *A01B 61/046* (2013.01); *A01B 49/027* (2013.01); *A01B 63/008* (2013.01); *A01C 5/06* (2013.01); *A01C 5/064* (2013.01); *A01C 5/068* (2013.01); *A01C 7/201* (2013.01); *A01C 7/205* (2013.01); *A01B 49/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,214,537 | A | * | 7/1980 | Bailey ..................... A01C 5/06 111/140 |
| 4,311,104 | A | | 1/1982 | Steilin et al. |
| 4,594,951 | A | * | 6/1986 | Grataloup .............. A01B 15/20 111/195 |
| 4,947,770 | A | | 8/1990 | Johnston |
| 5,398,771 | A | | 3/1995 | Hornung et al. |
| 7,617,782 | B2 | | 11/2009 | Sheppard et al. |
| 2011/0313575 | A1 | | 12/2011 | Kowalchuk et al. |
| 2012/0125244 | A1 | * | 5/2012 | Beaujot .................. A01C 7/205 111/149 |
| 2014/0216313 | A1 | * | 8/2014 | Bassett .................. A01B 49/06 111/139 |

FOREIGN PATENT DOCUMENTS

GB 2498530 7/2013

\* cited by examiner

*Primary Examiner* — Alicia Torres
(74) *Attorney, Agent, or Firm* — Rebecca L. Henkel; Rickard K. DeMille

(57) ABSTRACT

A suspension set for an agricultural implement includes a first arm, a holder attached to a portion of a chassis of the agricultural implement, the holder comprising an attachment point for receiving the first arm to allow pivoting of the first arm, a first flange associated with the first arm, and at least a disc associated with the first arm via the first flange. The holder comprises a second attachment point to receive a second arm to allow pivoting of the second arm. The first flange is replaced by a second flange when the second arm is inserted. The second flange is associated with the first and second arms and with the disc. Receipt of the second arm and replacement of the first flange by the second flange provides a pantographic movement to the disc.

15 Claims, 6 Drawing Sheets

SUSPENSION ASSEMBLY AND KIT FOR A PLANTER

CROSS REFERENCE TO RELATED APPLICATION

This application claims priority to Brazilian Application BR1020150082444, filed Apr. 13, 2015, the contents of which are incorporated herein by reference.

FIELD OF THE INVENTION

The invention refers in general to a soil working apparatus, such as an agricultural apparatus and, more specifically, the invention refers to a suspension for an opening disc of an agricultural apparatus, such as a planter.

BACKGROUND OF THE INVENTION

In general, planting implements (such as planters) are towed behind a tractor or other working vehicle through a hitch attached to a rigid structure of the implement, such as a chassis. These planting implements typically include multiple row units of planting distributed across the width of the implement, wherein said planting rows may vary in number, such as from 2 to 30 planting rows, or even more. Each planting unit is configured to cut the straw, open a groove in the soil, deposit seeds at a desired depth below the soil surface, thereby establishing planted seed rows, close the opened groove and, in some models, compact the soil after closing.

Optionally, planters may also comprise a system of fertilizer deposition on the soil when a groove is opened in the soil, wherein said fertilizer deposition may be carried out together with the opening disc. Furthermore, silos or tanks to store seeds and fertilizer, as well as systems for dispensing seeds and fertilizer may be coupled to the implement rigid structure, which herein is also referred to as chassis.

Planters are agricultural implement quite known and widespread in the state of the art, which is a reason why there is no need for more detailed description herein.

The discs performing the opening (groove) in the soil to allow seed deposit—herein referred to as opening disc—is usually mounted on a suspension to accompany the irregularities of the soil and open grooves at a constant depth. Seed deposit at a constant depth with respect to the soil surface is a desirable feature because it increases the crop yield, given that the growth of the crop will be more homogeneous with respect to seeds planted at different depths.

Under certain conditions and certain soil run by the planter, it may be desirable that the opening disc (or the opening discs, considering each opening disc of each planting row) exhibits a pivotal movement with respect to a support point, that is, the disc angularly varies its height in relation to a reference point. On the other hand, for other types of soil and planting conditions, it may be desirable that the opening disc exhibits a pantograph movement, that is, that it vertically varies its height in relation to a reference point.

The currently existing problem is that the known prior art planters have only one type of suspension, either pivoting or pantographic, and if the producer wants to vary the type of movement of the opening disc depending on the varying soil conditions, for instance, it is necessary to possess a second agricultural implement already provided with a different suspension from the one of the other available implement. Alternatively, in order to avoid purchasing a second implement, the producer would have to retrofit the existing implement, which would be time-consuming and relatively onerous.

Thus, there is the need for an agricultural implement, such as a planter, allowing the suspension of the opening disc to exhibit both a pivoting (angular) and a pantographic (vertical) movement to follow the soil irregularities with no need for major changes in the implement. The invention aims to meet this need, among others.

DESCRIPTION OF THE INVENTION

In order to achieve the aforementioned objective, among others, the invention refers to a suspension set for an agricultural implement, such as a planter, comprising:

a first arm;

A holder provided to be attached to a portion of the chassis of the agricultural implement and that comprises an attachment point for receiving said first arm to allow pivoting of said arm in relation to said attachment point;

a first flange associated with said first arm opposite to the attachment point; and at least a disc associated with the arm by means of said first flange;

wherein said holder additionally comprises a second attachment point to receive a second suspension arm to allow pivoting of said second arm in relation to said attachment point, wherein second arm may be inserted in the second attachment point; and said first flange may be replaced by said second flange when said second arm is inserted, wherein said second flange is associated with said first and second arms and with said disc;

wherein the insertion of the second arm and the replacement by the second flange provide a substantially pantographic movement to said disc.

According to additional and/or alternative embodiments of the invention, the following characteristics, alone or in technically possible combinations, may also be provided:

the disc is a opening disc to open a groove in the soil;

said opening disc comprises two discs concentrically mounted and opened in V-shape at a certain angle;

said first arm is associated—at the opposite end to said disc and at a different point of the pivot point—with an adjustable pressure means that allows adjusting the pressure exerted by said disc on the soil;

said means is a spring associated with a nut bolt that allows adjusting the pressure of said spring;

said first flange comprises at least two upper attachment points to attach to said first arm, and at least two lower attachment points to attach to said disc;

said second flange comprises an upper attachment point to attach to said second arm, an intermediate attachment point to attach to said first arm, and at least two lower attachment points to attach to said disc;

said disc is associated with said first or second flange by means of a disc holder;

said assembly comprises a straw-cutter disc associated with said holder to be attached to a portion of the chassis of the agricultural implement;

said first arm and/or said second arm are double arms consisting of two parallel segments;

said first flange and/or said second flange are double flanges consisting of two symmetrical parts;

said attachment point to receive said first arm and said second attachment point to receive said second arm are substantially vertically aligned; and said upper attachment point and said intermediate attachment point of said second flange are substantially vertically aligned.

The invention also refers to a suspension kit for an agricultural implement, such as a planter, wherein the suspension comprises:

a first arm;

a holder provided to be attached to a portion of the chassis of the agricultural implement and comprising an attachment point for receiving a first arm to allow pivoting of said first arm in relation to the attachment point;

a first flange associated with said first arm opposite to the attachment point;

at least a disc associated with the arm by means of said first flange; and said holder comprises a second attachment point to receive a second arm to allow pivoting of said second arm in relation to the attachment point;

wherein the kit comprises:

a second suspension arm; and a second flange, wherein the second suspension arm is provided to be attached—on one side—to said second attachment point of the holder and—on the other side—to the second flange, and the second flange is provided to replace said first flange to allow the attachment of said first and second arms; and the installation of said second arm and said second flange allows said disc to exhibit a pantographic movement.

According to additional and/or alternative aspects of this second embodiment of the invention, the following characteristics, among others, alone or in technically possible combinations, may also be provided:

said second flange comprises an upper attachment point to attach to said second arm, an intermediate attachment point to attach to said first arm, and at least two lower attachment points to attach to said disc;

said second arm is a double arm consisting of two parallel segments and said second flange is a double flange consisting of two symmetrical parts; and said kit further comprises attachment means of said second arm and said flange to the suspension.

BRIEF DESCRIPTION OF THE DRAWINGS

These and other aspects, advantages and characteristics of the invention will become clearer when the following detailed description is read with reference to the attached figures. These figures are schematic and their sizes or proportions may not correspond to reality, since they aim to describe the invention in a didactic way and do not impose any limitations other than those defined by the claims described below, wherein:

DETAILED DESCRIPTION OF THE DRAWINGS

Figure 1:
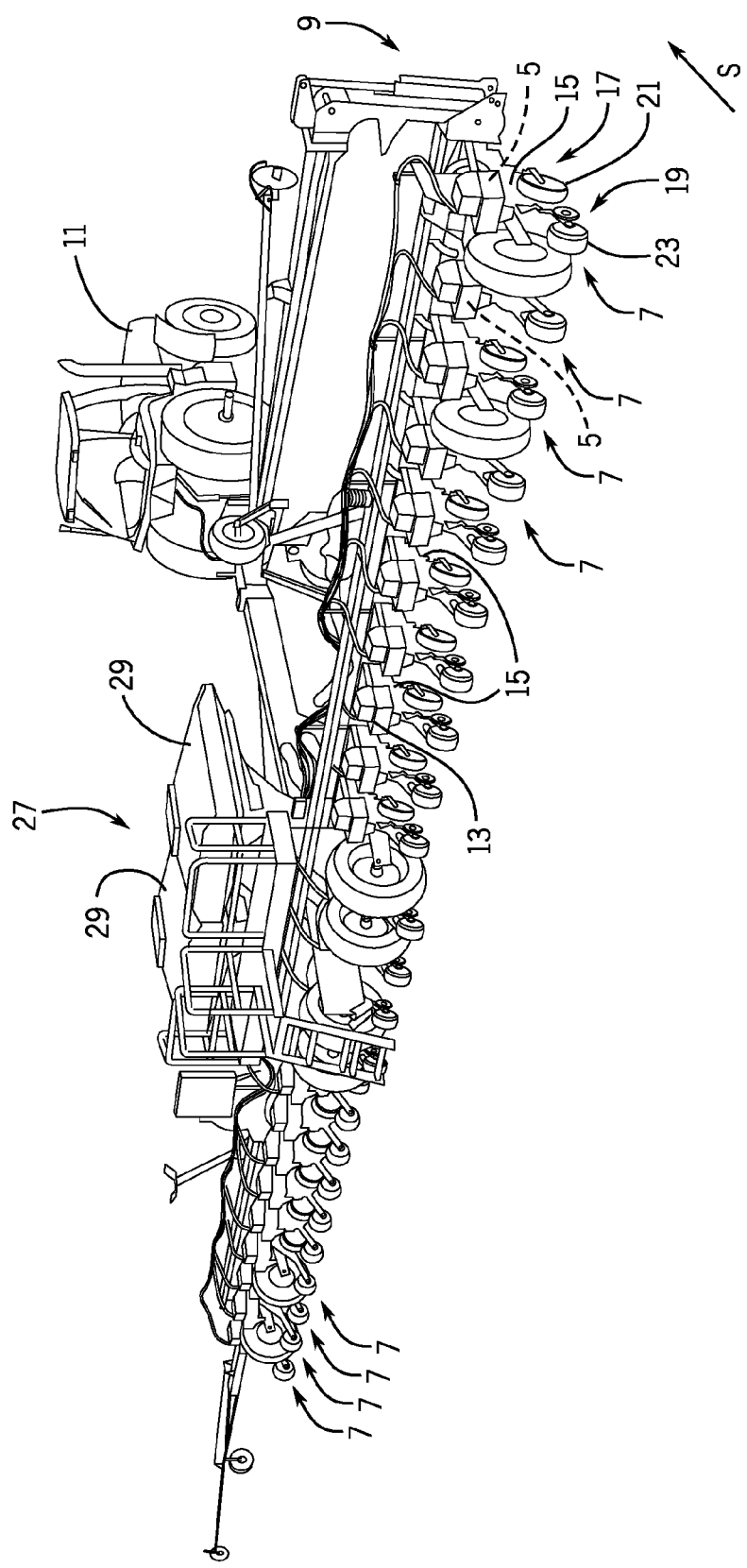
FIG. 1 is a rear perspective view of a planter associated with a work vehicle.

The invention is herein described through one particular embodiment, making reference to the figures as examples of embodiment of the invention. In the figures, the same reference numerals are used for identical or similar parts. Moreover, the terms: above, below, front, rear, right/left side, etc. must be construed according to the guidance provided in FIG. 1 or 2.

FIG. 1 is a schematic rear perspective view of a planter or seeder 9 comprising multiple planting rows 7 which may be configured to plant one type or multiple types or varieties of seeds. Planter 9 is typically pulled by a work vehicle 11, such as a tractor, in one planting direction S. A typical planter comprises a frame or chassis 13 in which each planting row 7 is mounted, as well as other common components of a planter, such as a subframe 15 which is connected to the frame 13 of the planter 9 by means of a known parallel attachment system and which defines the planting rows 7, which support the seed meter 5 and the opening 17 and closing mechanisms of the groove 19 toward the front and rear ends of the row unit 7. The opening and closing mechanisms 17, 19 may include opening discs and closing discs, respectively, or other tools to penetrate the soil to open and close a groove. Each planting row 7 may include an adjusting wheel 21 configured to adjust the groove depth by limiting the penetration of the soil by the groove opening mechanism 17 when a groove is being produced, and a pressure wheel 23 that may be arranged to roll on the closed groove to firm the soil placed on the seed to further close the groove and promote positive contact of the seed with the soil. Moreover, the planter may comprise a pneumatic distribution system configured to convey the seeds from the tanks to the seed meters 5 of the planting rows 7 and, in certain embodiments, it may comprise a pneumatic distribution system that includes a bulk storage system 27 comprising an inductor box placed below each seed tank 29, a fertilizer tank (not shown) and a system for distributing fertilizer to each planting row.

The planter described above is a planter model with typical components of a prior art planter.

The invention aims to provide a novel suspension and a kit for the groove opening mechanism 17, herein also referred to as 'opening disc'.

Figure 2:
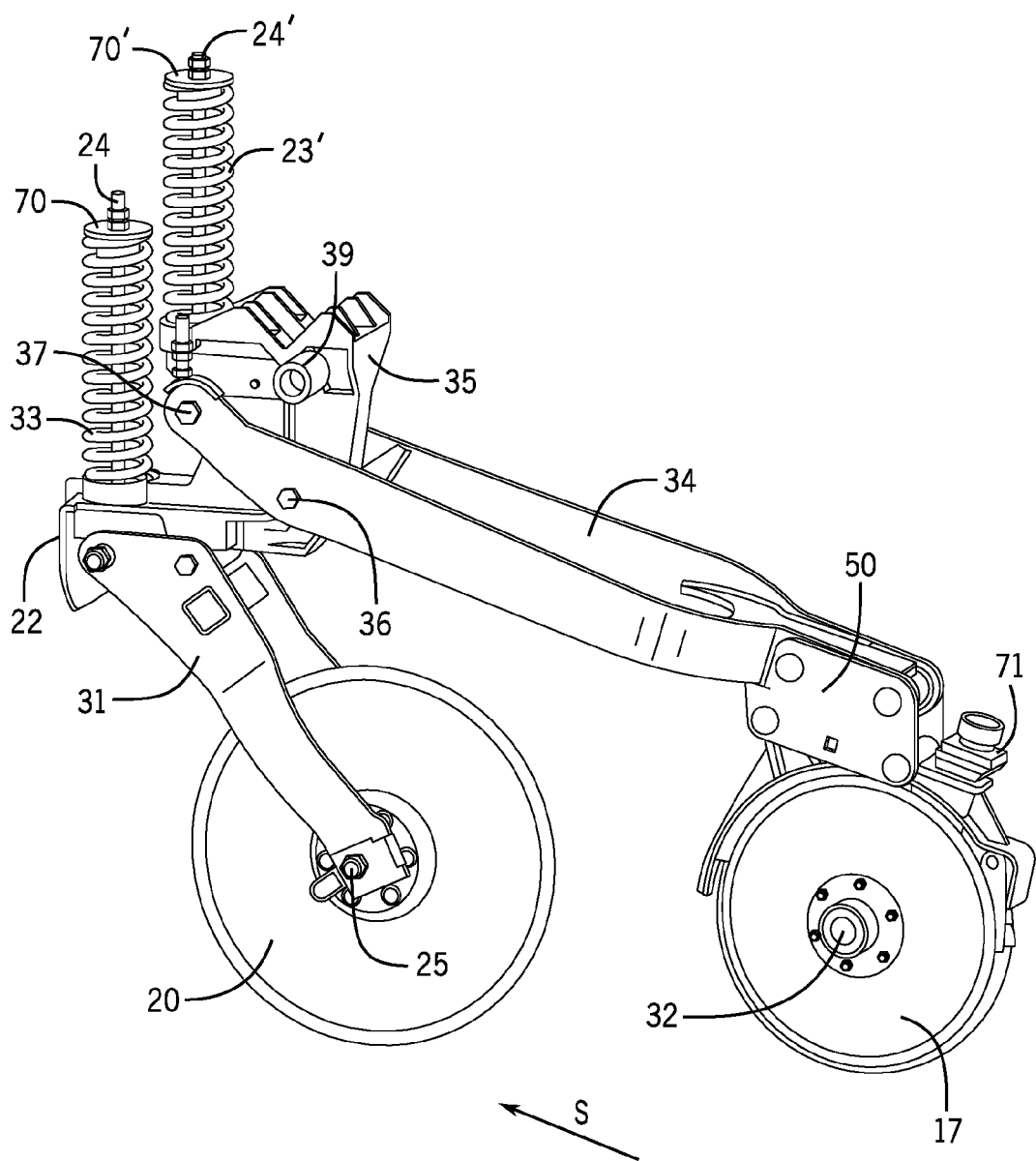
FIG. 2 is a perspective view of an embodiment of a suspension for opening disc according to one embodiment of the invention, in its pivoting configuration.
Figure 3:
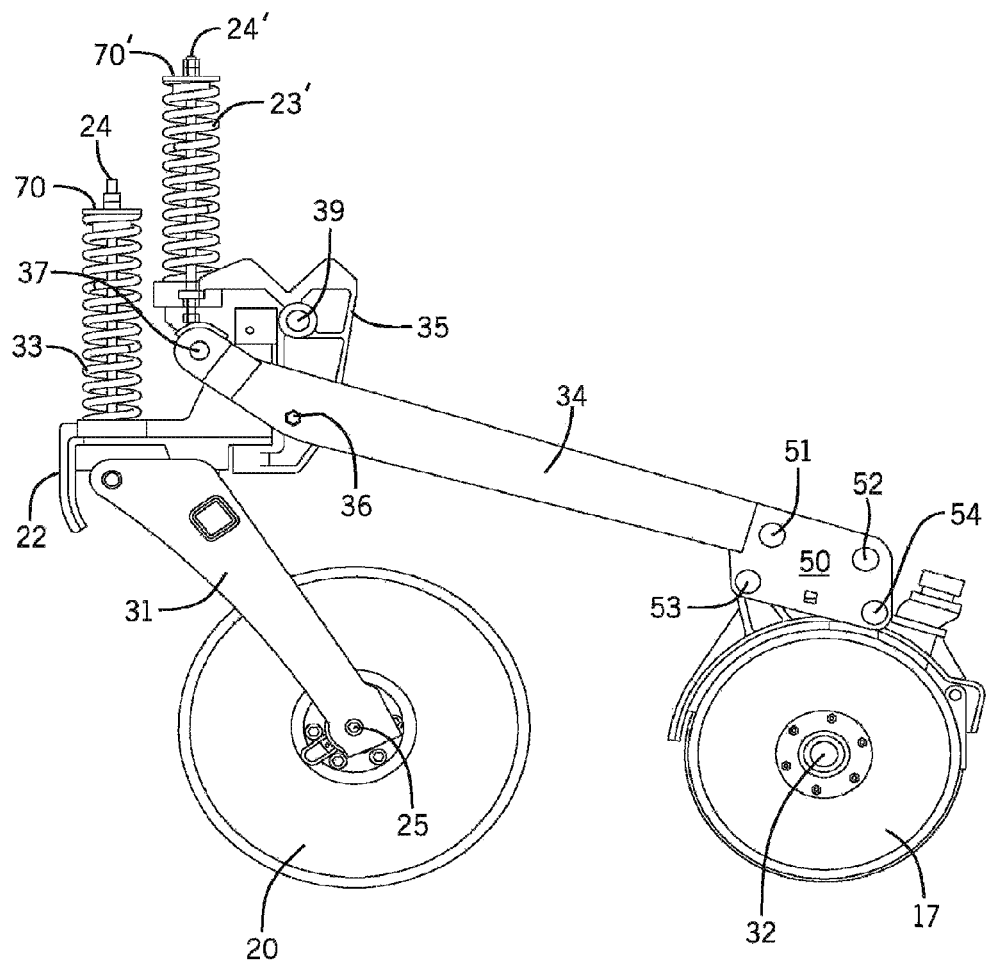
FIG. 3 is a side view of the suspension of FIG. 2.

FIGS. 2 and 3 show a suspension according to the invention in a configuration wherein the opening disc 17 performs a pivoting movement to follow the soil irregularities. The figures further show a straw-cutter disc 20 that is usually placed before the opening disc. The closing 19 and compacting 23 mechanisms are not shown in the following figures for didactic purposes but they are also part of the planting rows 7 and usually are placed behind the opening disc 17.

The straw-cutter disc 20 is supported by an arm 31 that—on one side—is associated with the central shaft 25 of the straw-cutter disc and—on the on the other side—is connected to a support 22, the latter in turn being associated with a holder 35 that is attached to the chassis 13 of the planter. The attachment of arm 31 to straw-cutter disc 20 and to support 22 may be attained by conventional means, using known mechanical attachment elements, such as bolts, nuts, pins, rivets, etc. Support 22 may be attached in a pivoting way relative to holder 35, such as through a shaft so as to allow the arm 31 to develop a free rotational movement about its vertical shaft. Alternatively, the support 22 may be rigidly attached to holder 35.

A helical spring 33 extends above support 22 to which it is secured, for instance, by means of a nut bolt 24. Spring 33 is—on one side—supported by support 22 and—on the other side—attached through, for instance, a plate 70. The bolt concentrically with respect to the helical spring is associated with arm 31 of the straw-cutter disc and, thereby, the nut allows the spring force to be adjusted to increase or decrease the force exerted on the arm 31 and the disc 20 and, thereby, increase or decrease the pressure that the disc exerts on the soil.

After the straw-cutter disc, following the orientation of the planting and/or seeding defined by the arrow S, there is the opening disc 17. Although the instant specification mentions an "opening disc" or soil opening disc, in the singular, it is certain that the most common configurations known for an opening disc actually comprise two discs mounted next to each other in a V-shaped arrangement and with a certain angle that precisely determines the size of the groove to be opened in the soil. A channel 71 to deposit fertilizer or seeds that is associated with a system for distributing fertilizer and/or seeds may also be provided together with the opening disc.

The opening disc 17 is mounted on a suspension and, therefore, its central shaft 32 is associated with a holder 40 of the opening disc (shown in FIG. 5) that, in turn, is linked to a flange 50 that is associated with an arm 34 of the suspension. Suspension 40 provides an attachment point to the central shaft 32 of the opening disc and two attachment points 43, 44 with two attachment points 53, 54 to the flange, as configured. Naturally, other forms of attachment may also be provided to achieve the same technical effect. The attachment means used for the opening disc, the holder and the flange may be known mechanical attachment means, such as bolts, nuts, rivets, etc.

In turn, arm 34 extends from flange 50 to a pivot point 36 provided on the holder of the chassis 35, which defines the pivoting movement of the disc to follow the soil irregularities and ends in its other end 37 in a spring system similar to the one described for the straw-cutter disc and that comprises a helical spring 23' supported—on one side—by holder 35 and—on the other side—by plate 70'. A bolt associated with nut 24' is concentrically mounted within the helical spring and—on one side—is associated with the nut in plate 70' and—on the other side—is attached to the arm 34. The variation of the nut tightening allow increasing or decreasing the spring force exerted on the arm 34 and, consequently, on disc trencher 17. Holder 35 contains the pivot point of the arm 36 and, accordingly, it comprises a through hole to ensure this pivot point. As mentioned, the upper portion of holder 35 is attached to chassis 13 of the planter through suitable means, such as braces, bolts, nuts, pins, welding etc. Moreover, the other attachment elements placed between the holder 35, the arm 34, the flange 50, the disc 30, the disc holder 40, the pivot point 36 etc., as already mentioned, may also be known mechanical connection elements, such as bolts, rivets, pins, etc.

In this particular embodiment, flange 50 has four attachment points 51, 52, 53, 54, wherein two upper attachment points 51, 52 are provided to be attached to the arm 34, which also has two attachment points corresponding to the flange, and two lower attachment points 53, 54 are provided to be attached to attachment points 43, 44 of the disc holder 40, as it has already been mentioned.

As it can be seen in FIGS. 1 and 2, in this configuration, due to the irregularities of the soil, the movement of disc 17 would be a pivoting movement, that is, the disc height will vary angularly in relation to the soil by the angular variation in relation to pivot point 36.

Figure 4:
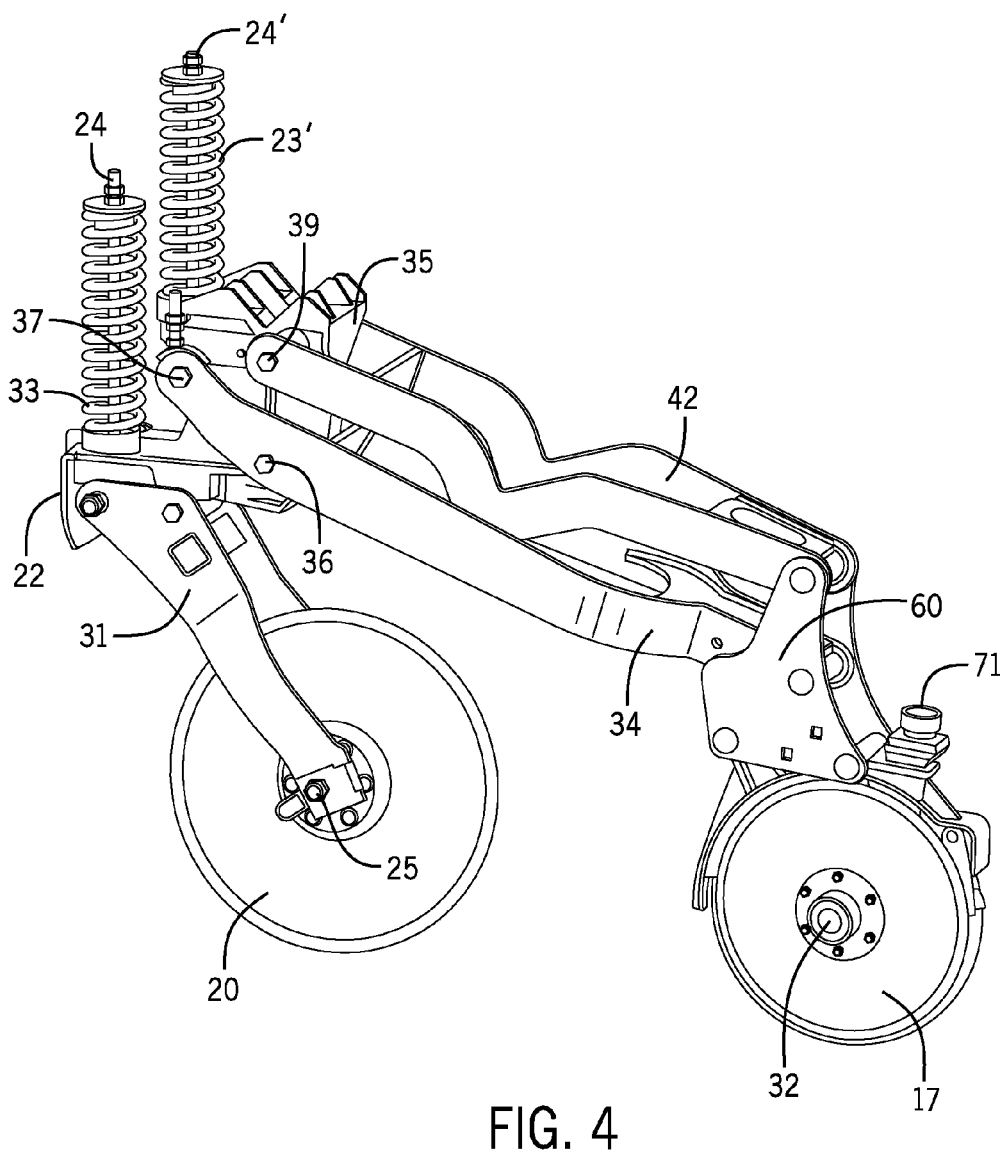
FIG. 4 is a perspective view of the suspension for opening disc according to one embodiment of the invention, as shown in FIG. 2, however in its pantographic configuration.
Figure 5:
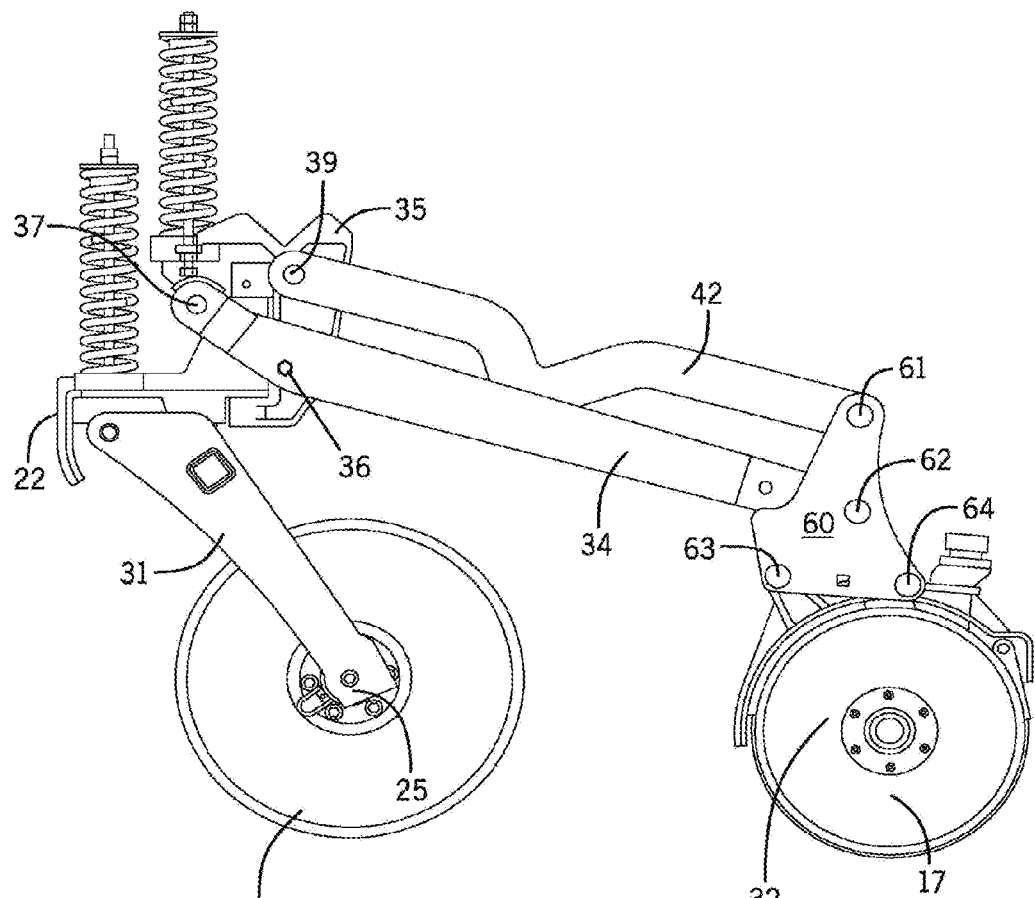
FIG. 5 is a side view of the suspension of FIG. 4.

FIGS. 3-5 show the suspension set of the invention in a second configuration that allows disc 17 to perform a pantographic movement. This configuration provides the insertion of a second arm 42 that—on one side—is attached to a second pivot point 39 provided in holder 35 and—on the other side—it is attached to a flange 60, different from the first flange 50 described above. Accordingly, holder 35 comprises a second hole provided to receive the end of the second arm 42 to form the second pivot point 39, as already mentioned. The second flange 60 further comprises four attachment points, however, the upper attachment point 61 is provided to attach to the side of the second arm 44 opposite to the side of its pivot point 39; the intermediate attachment point 62 is provided to attach to the side of the first arm 34 opposite to the side of its pivot point 36 and at only one attachment point of the two provided in the first arm 34; and the two lower attachment points 63, 64 being provided to attach to disc holder 40 in respective holes 43, 44.

Hence, as those skilled in the art will appreciate, the insertion of second arm 42 and the replacement of first flange 50 by second flange 60 will allow disc 17 to exhibit a pantographic movement, that is, the height variation of the opening disc 17 will be linearly vertical in relation to the soil.

Although the foregoing description relates to a "first arm" 34, a "second arm" 42, a "first flange" 50, a "second flange" 60 etc., it is certain that, according to the embodiment shown in the figures, each arm may consist of a double arm, and each flange may consist of two flanges, each one attached to each side of the arm and of the disc holder. The option of using a single or double arm, as well as single or double flange may be determined by design conditions. In a possible variation, the arms may be double and the flanges may be single, attached in the middle to the inner face of each side of the arm, and vice versa, that is, the arms may be single arms, wherein two flanges may be attached to each side of the outer face of the arm. The determination of the shape configurations of the arms and flanges may be similarly determined by design conditions and cost limitations.

Figure 6:
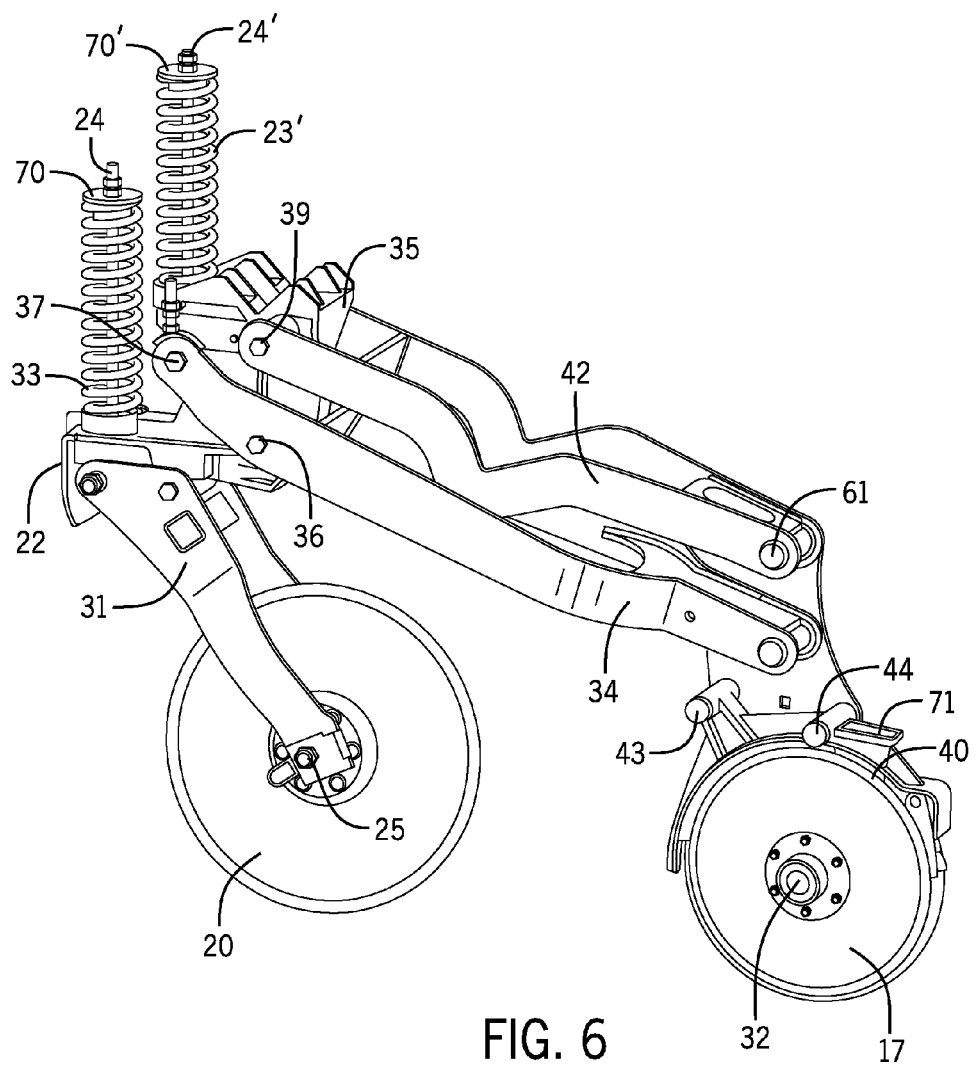
FIG. 6 is a perspective view similar to that shown in FIG. 4, wherein certain elements were removed to allow viewing the disc trencher holder.

The variation of the displacement angle of opening disc 17 when the suspension exhibits the pivoting form, as shown in FIGS. 2 and 3, is a result of the distance between pivot point 36 and attachment point 37 of arm 34, and may be determined by design specifications. Likewise, the variation of pantographic displacement, as shown in FIGS. 4 and 6, may be similarly a result of the design specifications, being relevant that the second pivot point 39 of second arm 42 is at least approximately vertically aligned with the first pivot point 36 in order to ensure the pantographic movement. The geometry of second flange 60 similarly may vary, however it is also relevant that the upper attachment point 61 is at least approximately vertically aligned with the intermediate attachment point 62 in order to ensure the pantographic movement.

The invention further relates to a suspension kit for an agricultural implement, such as a planter. The kit may be provided with a second arm 42 and a second flange 60, in sufficient amount for the row units of the planter, or individually, wherein as many kits as needed for the number of planting rows (or row units) of the planter may be purchased. Hence, second arm 42 may be inserted in holder 35, and second flange 60 may replace first flange 50 in order to turn the pivoting movement of the disc into a pantographic movement. Additional mechanical elements to attach second arm 42 and replace first flange 50, such as bolts, nuts, pins, plugs, etc. may be additionally provided to be offered together with the kit.

Based on the foregoing description, it is clear that the instant invention enables the suspension of an agricultural implement, such as a planter, and in particular the suspension of a opening disc of a planter, to be easily alternate from a pivoting movement suspension to a pantographic movement suspension or vice versa, by simply inserting or removing a second suspension arm 42 and replace a flange 50 by another one 60.

Therefore, based on the foregoing description, it is evident that the invention enables an agricultural implement, such as a planter, to alternate in a relatively quickly and simple manner the movement of at least one of its discs, such as the groove opening disc, both in an angular form and in a pantographic form, with no need of purchasing different apparatuses or retrofitting existing apparatuses.

While only certain features of the invention have been illustrated and described herein, many modifications and changes will occur to those skilled in the art upon reading the teachings herein. Therefore, it should be understood that the attached claims are intended to cover all these changes and modifications insofar as they fall under the true spirit of the invention.

The invention claimed is:

1. A suspension for an agricultural implement including a planter, wherein the suspension set comprises:
    a first arm;
    a holder provided to be attached to a portion of a chassis of the agricultural implement and comprising an attachment point for receiving said first arm to allow pivoting of said first arm in relation to said attachment point;
    a first flange associated with said first arm opposite to the attachment point; and
    at least a disc associated with the first arm by means of said first flange;
    wherein said holder additionally comprises a second attachment point to receive a second arm to allow pivoting of said second arm in relation to said second attachment point,
    wherein the second arm is configured to be received by the second attachment point,
    wherein said first flange is replaced by a second flange when said second arm is added, wherein said second flange is associated with said first and second arms and with said disc, and
    wherein receipt of the second arm and the replacement of the first flange by the second flange provide a substantially pantographic movement to said disc.

2. The set according to claim 1 wherein said disc is an opening disc that can open a groove in the soil.

3. The set according to claim 2 wherein said opening disc comprises two discs concentrically mounted and opened in V-shape at a certain angle.

4. The set according to claim 1 wherein said first arm is associated with an adjustable pressure means that allows adjusting the pressure exerted by said disc on the soil.

5. The set according to claim 4 wherein said means is a spring associated with a nut bolt that allows adjusting the pressure of said spring.

6. The set according to claim 1 wherein said first flange comprises at least two upper attachment points to attach to said first arm, and at least two lower attachment points to attach to said disc.

7. The set according to claim 1 wherein said second flange comprises an upper attachment point to attach to said second arm, an intermediate attachment point to attach to said first arm, and at least two lower attachment points to attach to said disc.

8. The set according to claim 1 wherein said disc is associated with said first or second flange by means of a disc holder.

9. The set according claim 1 further comprising a straw-cutter disc associated with said holder provided to be attached to a portion of the chassis of the agricultural implement.

10. The set according to claim 1 wherein said first arm and said second arm are double arms consisting of two parallel segments.

11. The set according to claim 1 wherein that said first flange and said second flange are double flanges consisting of two symmetrical parts.

12. The set according to claim 1 wherein said attachment point to receive said first arm and said second attachment point to receive said second arm are substantially vertically aligned.

13. The set according to claim 7 wherein said upper attachment point and said intermediate attachment point of said second flange are substantially vertically aligned.

14. A suspension kit for an agricultural implement including a planter, wherein said suspension kit comprises:
    a first arm;
    a holder provided to be attached to a portion of a chassis of the agricultural implement and the holder comprises an attachment point for receiving the first arm to allow pivoting of said first arm in relation to the attachment point;
    a first flange associated with said first arm opposite to the attachment point;
    at least a disc associated with the first arm via said first flange; and
    said holder comprises a second attachment point to receive a second arm to allow pivoting of said second arm in relation to the second attachment point;
    wherein the kit comprises:
    the second arm; and
    a second flange,
    wherein the second arm is provided to be attached on one side to said second attachment point of the holder and on an opposite side to the second flange,
    wherein the second flange is provided to replace said first flange to allow the attachment of said first and second arms, and
    wherein receipt of said second arm and replacement of said first flange with said second flange allows said disc to exhibit a pantographic movement.

15. The kit according to claim 14 wherein said second flange comprises an upper attachment point to attach to said second arm, an intermediate attachment point to attach to said first arm, and at least two lower attachment points to attach to said disc.

* * * * *